(12) United States Patent
Moon et al.

(10) Patent No.: US 11,772,758 B2
(45) Date of Patent: Oct. 3, 2023

(54) APPARATUS, METHOD, AND RECORDING MEDIUM FOR AUTONOMOUS SHIP NAVIGATION

(71) Applicant: Electronics and Telecommunications Research Institute, Daejeon (KR)

(72) Inventors: Kyeong Deok Moon, Daejeon (KR); Yun Kyung Park, Daejeon (KR); Chi Yoon Jeong, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 393 days.

(21) Appl. No.: 17/072,675

(22) Filed: Oct. 16, 2020

(65) Prior Publication Data

US 2021/0114698 A1 Apr. 22, 2021

(30) Foreign Application Priority Data

Oct. 18, 2019 (KR) .......................... 10-2019-0130283

(51) Int. Cl.
| | |
|---|---|
| *B63B 49/00* | (2006.01) |
| *G01C 21/00* | (2006.01) |
| *G05D 1/02* | (2020.01) |
| *G06N 3/08* | (2023.01) |
| *G06V 10/764* | (2022.01) |
| *G06V 10/82* | (2022.01) |
| *G06V 10/40* | (2022.01) |
| *G06V 20/00* | (2022.01) |

(52) U.S. Cl.
CPC ............ *B63B 49/00* (2013.01); *G01C 21/387* (2020.08); *G01C 21/3844* (2020.08); *G05D 1/0206* (2013.01); *G06N 3/08* (2013.01); *G06V 10/40* (2022.01); *G06V 10/764* (2022.01); *G06V 10/82* (2022.01); *G06V 20/00* (2022.01)

(58) Field of Classification Search
CPC .. B63B 49/00; G01C 21/3844; G01C 21/387; G05D 1/0206; G06N 3/08; G06V 20/13
USPC .......................................................... 701/21
See application file for complete search history.

(56) References Cited

U.S. PATENT DOCUMENTS

| | | | | |
|---|---|---|---|---|
| 6,629,037 B1 * | 9/2003 | Nyland | ................ | G01V 1/3808 |
| | | | | 702/14 |
| 8,614,633 B1 * | 12/2013 | Lear | .................... | G08B 29/188 |
| | | | | 340/984 |

(Continued)

FOREIGN PATENT DOCUMENTS

| | | |
|---|---|---|
| KR | 10-2017-0088123 | 8/2017 |
| KR | 10-2007196 | 8/2019 |

*Primary Examiner* — Krishnan Ramesh
(74) *Attorney, Agent, or Firm* — KILE PARK REED & HOUTTEMAN PLLC (57) ABSTRACT

Provided is an autonomous ship navigation apparatus including an acquisition unit configured to acquire a surrounding environment image, marine information, and navigation information, a map generation unit configured to generate a grid map by displaying topography, a host ship, and an obstacle corresponding to the marine information and the navigation information in the surrounding environment image, and a sailing method determination unit configured to determine a sailing method of a ship through deep reinforcement learning based on the grid map, the marine information, and the navigation information.

18 Claims, 7 Drawing Sheets

(56) References Cited

U.S. PATENT DOCUMENTS

| | | |
|---|---|---|
| 8,949,015 B2 | 2/2015 | Choi |
| 2012/0265380 A1* | 10/2012 | Kuwata ................ G05D 1/0206 |
| | | 701/21 |
| 2015/0241560 A1 | 8/2015 | Lee et al. |
| 2016/0114867 A1* | 4/2016 | Nicol ..................... G01C 19/58 |
| | | 701/21 |
| 2020/0050202 A1* | 2/2020 | Suresh ................... G06V 20/00 |
| 2020/0050893 A1* | 2/2020 | Suresh .................... G06T 11/40 |
| 2022/0144392 A1* | 5/2022 | Raviv ..................... B63B 79/00 |

* cited by examiner

APPARATUS, METHOD, AND RECORDING MEDIUM FOR AUTONOMOUS SHIP NAVIGATION

CROSS-REFERENCE TO RELATED APPLICATION

This application claims priority to and the benefit of Korean Patent Application No. 10-2019-0130283, filed on Oct. 18, 2019, the disclosure of which is incorporated herein by reference in its entirety.

BACKGROUND

1. Field of the Invention

Various embodiments disclosed herein relate to autonomous ship navigation technology.

2. Discussion of Related Art

In the past few years, the number of crew members permitted on board a ship, as well as experienced crew members, has decreased dramatically. Thus, ship accidents due to crew mistakes are increasing rapidly. Since ship accidents cause great loss of life and destruction of environment, there is a need for a countermeasure so as to safely sail a ship with a small number of crew members.

A conventional automatic ship navigation system can only automatically sail a ship in a predetermined manner along a specific route under the supervision of the captain and cannot sail a ship while adequately coping with unexpected changes in circumstances without the supervision of the captain. In order to solve this problem, a conventional unmanned navigation system sails a ship based on an analytical method for mathematically modeling a ship sailing state to determine a ship navigation method.

SUMMARY OF THE INVENTION

However, the analytical method is applicable to an uncomplicated or simplified environment and cannot cope with variable factors. This is because, although a navigation method corresponding to the all states of a ships should be defined in order to determine a ship navigation with an analytical method, a ship sailing state is determined by interaction with various factors and thus it is difficult to define the all sailing states of the ship. For example, the same ship sailing state may lead to different instances of ship sailing due to variable factors such as ship characteristics, marine characteristics, and the characteristics of nearby ships, and thus it is practically impossible to define a navigation method corresponding to all sailing states of a ship. Therefore, so far, crews are still more dependent on their own decisions based on their experience than on a route determined based on an analytical method.

Various embodiments disclosed herein may provide an autonomous ship navigation apparatus and method capable of autonomously navigating a ship based on a surrounding environment state and a ship sailing state and a recording medium therefor.

According to an aspect of the present invention, there is provided an autonomous ship navigation apparatus including an acquisition unit configured to acquire a surrounding environment image, marine information, and navigation information, a map generation unit configured to generate a grid map by displaying topography, a host ship, and an obstacle corresponding to the marine information and the navigation information in the surrounding environment image, and a sailing method determination unit configured to determine a sailing method of a ship through deep reinforcement learning based on the grid map, the marine information, and the navigation information.

Also, according to an aspect of the present invention, there is provided an autonomous ship navigation method including acquiring a surrounding environment image, marine information, and navigation information, generating a grid map by displaying topography, a host ship, and an obstacle corresponding to the marine information and the navigation information in the surrounding environment image, and determining a sailing method of a ship through deep reinforcement learning based on the grid map, the marine information, and the navigation information.

Also, according to an aspect of the present invention, there is provided a computer-readable recording medium storing processor-executable instructions, the instructions causing a processor of an autonomous ship navigation apparatus to acquire a surrounding environment image, marine information, and navigation information, generate a grid map by displaying topography, a host ship, and an obstacle corresponding to the marine information and the navigation information in the surrounding environment image, and determine a sailing method of a ship through deep reinforcement learning based on the grid map, the marine information, and the navigation information.

BRIEF DESCRIPTION OF THE DRAWINGS

In describing the accompanying drawings, the same or similar reference numerals may be used to designate the same or similar elements.

DETAILED DESCRIPTION OF EXEMPLARY EMBODIMENTS

Figure 1:
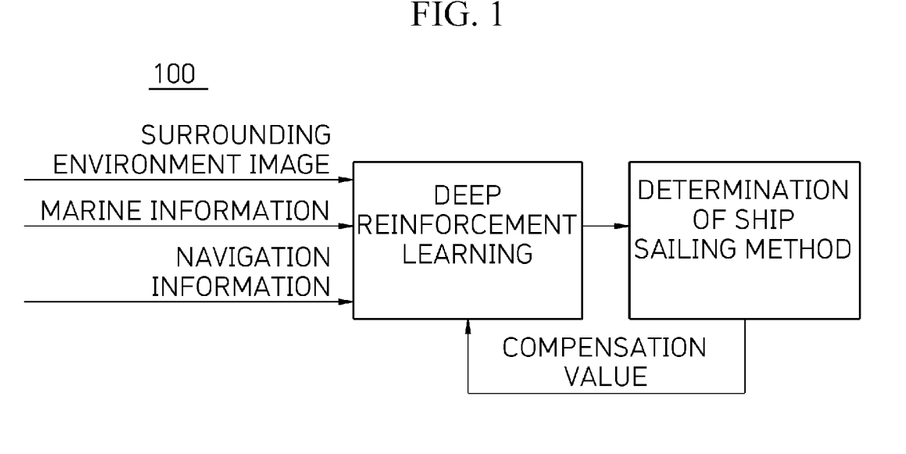
FIG. 1 shows a conceptual diagram of an autonomous ship navigation apparatus according to an embodiment.

FIG. 1 shows a conceptual diagram of an autonomous ship navigation apparatus according to an embodiment.

Referring to FIG. 1, according to an embodiment, an autonomous ship navigation apparatus 100 may acquire a surrounding environment image of a ship through a marine chart image or a camera installed on the ship. The autonomous ship navigation apparatus 100 may acquire navigation information related to the ship and marine information related to the surrounding environment of the ship through a signal receiving circuit and a sensor circuit installed in the ship.

According to an embodiment, the autonomous ship navigation apparatus 100 may generate a grid map by displaying topography, a host ship, and obstacles corresponding to marine information and navigation information in the surrounding environment image. The autonomous ship navigation apparatus 100 may check (e.g., extract) first feature information related to a surrounding environment state of a ship on the basis of the grid map. The first feature information may include an image feature vector related to at least one surrounding environment factor among topographic features (e.g., coastlines, contour lines, water depths, reefs, route marks, and dangerous regions (which may include avoidance regions)) and obstacle features (e.g., a distance between the host ship and an obstacle) of the surrounding environment. The grid map may be a map obtained by mapping pixel coordinates of each surrounding environment factor included in the surrounding environment image to a grid with a specified interval (e.g., an interval with a latitude of 1° and a longitude of 1.25°) corresponding to the Earth's coordinate system.

According to an embodiment, the autonomous ship navigation apparatus 100 may check (e.g., extract) second feature information related to dynamic characteristics of a ship on the basis of the marine information and the navigation information. The second feature information may include a feature vector related to the ship-specific dynamic characteristics corresponding to a surrounding marine state including at least one of a ship speed, a bow direction, stability performance, motion performance, a synchronization risk between the host ship and waves, and a ship speed decrease rate of the ship (host ship). The ship-specific dynamic characteristics corresponding to the surrounding marine state may refer to dangerousness of the surrounding marine state to a ship sailing (hereinafter referred to as "surrounding marine dangerousness"). In this regard, the autonomous ship navigation apparatus 100 may extract the second feature information on the basis of the marine information and navigation information corresponding to a surrounding environment included in the surrounding environment image.

According to an embodiment, the autonomous ship navigation apparatus 100 may determine a ship sailing method (e.g., a ship speed and a bow direction) through deep reinforcement learning based on the first feature information and the second feature information. For example, the autonomous ship navigation apparatus 100 may determine a speed and a bow direction for autonomous navigation on the basis of the first feature information and the second feature information so that a risk factor (e.g., third-party ships, obstacles, reefs, and dangerous regions) can be avoided while the surrounding marine dangerousness is in a specified range (e.g., a range specified to stably sail the ship). The ship sailing method may indicate the determined ship speed and bow direction or a ship control command corresponding to the determined ship speed and bow direction. Herein, for convenience of description, an example in which the ship sailing method indicates the determined ship speed and bow direction will be described.

According to an embodiment, the autonomous ship navigation apparatus 100 may control ship navigation according to a sailing method determined by transmitting the ship control command (e.g., the ship speed and the bow direction) corresponding to the determined ship sailing method to a control module (e.g., an engine, a rudder, and the like) included in the ship.

According to an embodiment, the autonomous ship navigation apparatus 100 may check a ship sailing result corresponding to the ship control command (e.g., marine information and navigation information acquired after the ship control command is transmitted) and determine a compensation value for a predetermined ship sailing method on the basis of the checked result. The autonomous ship navigation apparatus 100 may determine a compensation value related to the sailing method according to a required cost change or according to how much a ship state changed according to the ship sailing method meets a target state. Subsequently, the autonomous ship navigation apparatus 100 may determine a subsequent ship navigation method on the basis of ship sailing methods in which the determined compensation value is reflected. In this way, the autonomous ship navigation apparatus 100 may determine a sailing method that can increase a cumulative compensation value.

As described above, according to the above-described embodiment, the autonomous ship navigation apparatus 100 may generate a grid map for the surrounding environment of the ship, analyze the surrounding environment of the ship on the basis of the grid map as the captain checks visually, and determine a ship sailing method on the basis of a result of the analysis.

Also, according to the above-described embodiment, the autonomous ship navigation apparatus 100 may associate marine chart information (e.g., coastlines and water depths), weather-related information (e.g., sea waves, seawater temperatures, seawater densities, wind, and sea tides), and risk factor information (e.g., third-party ships, pieces of floating matter, and dangerous regions) according to a grid of specified intervals and may comprehensively analyze the marine chart information, the weather-related information, and the surrounding environment image.

In addition, according to the above-described embodiment, the autonomous ship navigation apparatus 100 may stably navigate the ship even when there is a change in the surrounding sea by determining a ship sailing method in consideration of not only the ship state information (e.g., location, speed, and bow direction) but also surrounding marine dangerousness on the basis of the marine information and the navigation information.

Figure 2:
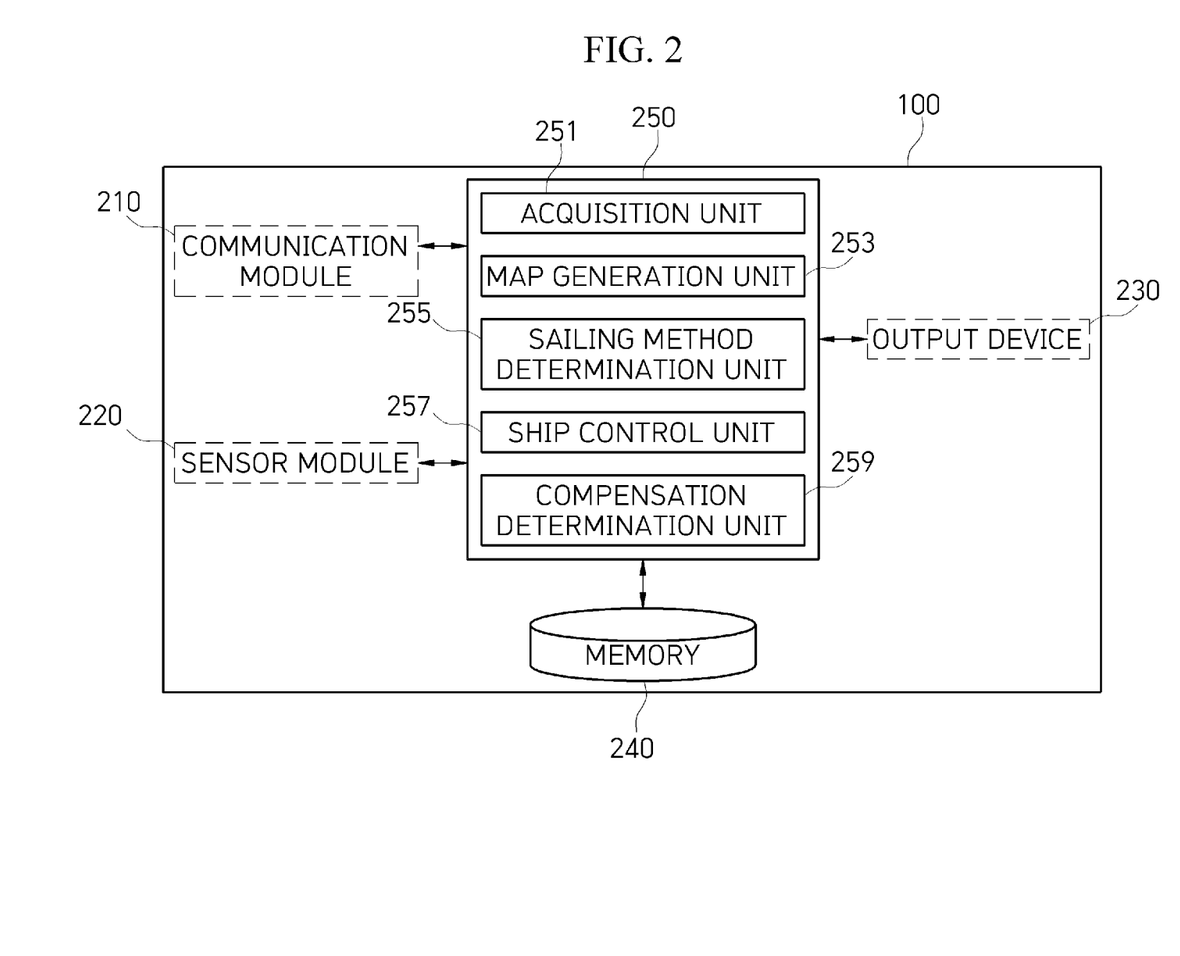
FIG. 2 shows a block diagram of an autonomous ship navigation apparatus according to an embodiment.

FIG. 2 shows a block diagram of an autonomous ship navigation apparatus according to an embodiment.

Referring to FIG. 2, an autonomous ship navigation apparatus 100 according to an embodiment (e.g., the autonomous ship navigation apparatus 100 of FIG. 1) may include a communication module 210, a sensor module 220, an output device 230, a memory 240, and a processor 250. In an embodiment, the autonomous ship navigation apparatus 100 may exclude some elements or further include additional elements. For example, the communication module 210, the sensor module 220, the output device 230, and the memory 240 may be excluded. An example in which the autonomous ship navigation apparatus 100 includes the communication module 210, the sensor module 220, and the output device 230 will be described below. However, the present invention is not limited thereto. Also, some of the elements of the autonomous ship navigation apparatus 100 are combined into a single entity, and the functions of the corresponding elements before the combination may be performed in the same manner.

According to an embodiment, the communication module 210 may establish a wired or wireless communication channel between the autonomous ship navigation apparatus 100 and other apparatuses (e.g., a marine weather forecast server) and support communication through the established communication channel. For example, the communication channel may be a satellite communication channel. The communication module 210 may receive weather forecast information from the marine weather forecast server in units of a specified time (e.g., six hours). For example, the weather forecast information may include at least one weather condition selected from among wind, sea tides, sea waves, seawater temperatures, seawater densities, and sea ripples which are related to a ship location or include marine state information related to the weather condition.

According to an embodiment, the sensor module 220 may include at least one of an auto-identification system (AIS) and an automatic radar plotting aid (ARPA). The MS may perform satellite communication through the communication module 210 and receive information on third-party ships sailing near a host vehicle (e.g., the locations, destinations, and speeds of the third-party ships) from the third-party ships. The ARPA may measure information on distances from third-party ships (external ships) that are located near the host ship and detected through a radar (not shown).

According to an embodiment, the sensor module 220 may include a camera and various kinds of sensors installed in an unmanned ship. For example, the various kinds of sensors may include a speed measurement sensor and a direction measurement sensor for measuring a ship sailing state. As another example, the various kinds of sensors may include at least one of a wind measurement sensor, a sea tide measurement sensor, a wave measurement sensor, a seawater temperature measurement sensor, and seawater density measurement sensor and a sea ripple measurement sensor which are related to the surrounding environment of the ship.

According to an embodiment, the output device 230 may include, for example, a liquid crystal display (LCD), a light-emitting diode (LED) display, or an organic light-emitting diode (OLED) display.

According to an embodiment, the memory 240 may store various data used by at least one element (e.g., the processor 250) of the autonomous ship navigation apparatus 100. The data may include, for example, input data or output data for software and relevant commands. For example, the memory 240 may store at least one instruction for sailing method determination based on deep reinforcement learning. The memory 240 may store autonomous navigation data including ship-specific information, sailing plan information, marine information, and navigation information according to the command of the processor 250. The ship-specific information includes basic information of the ship (e.g., ship name, ship number, ship specification, and navigation equipment characteristics). The sailing plan information may include information related to a navigation plan (e.g., an origin, a destination, an estimated sailing time, and a ship control condition). The marine information and the navigation time will be described below. The memory 240 may include a volatile memory or a nonvolatile memory.

The processor 250 may control at least one other element (e.g., a hardware or software element) of the autonomous ship navigation apparatus 100 and may perform various data processing or operations. For example, the processor 250 may include at least one of a central processing unit (CPU), a graphics processing unit (GPU), a microprocessor, an application processor, an application-specific integrated circuit (ASIC), and a field-programmable gate array (FPGA) and may have a plurality of cores.

According to an embodiment, the processor 250 may include an acquisition unit 251, a map generation unit 253, a sailing method determination unit 255, a ship control unit 257, and a compensation determination unit 259. Each of the elements of the processor 250 may be a separate hardware module or a software module implemented by at least one processor 250. For example, functions performed by each module included in the processor 250 may be performed by one processor or may be performed by separate processors.

Herein, for convenience of description, the following description of each element of the processor 250 will focus on the acquisition unit 251, the map generation unit 253, the sailing method determination unit 255, the ship control unit 257, and the compensation determination unit 259.

According to an embodiment, the acquisition unit 251 may acquire a surrounding environment image, marine information, and navigation information from at least one of the communication module 210 and the sensor module 220. The acquisition unit 251 may store the acquired surrounding environment image, marine information, and navigation information in the memory 240 in relation to their acquisition times.

In an embodiment, the acquisition unit 251 may acquire a surrounding environment image including a front environment, a rear environment, and a lateral environment of the ship from at least one camera capable of capturing the front environment, the rear environment, and the lateral environment. Additionally or alternatively, when receiving a plurality of images related to a surrounding environment from at least one camera, the acquisition unit 251 may generate a surrounding environment image by combining the plurality of images with respect to the ship.

In an embodiment, the acquisition unit 251 may receive the marine information and navigation information from at least one of the communication module 210 or the sensor module 220. For example, the acquisition unit 251 may acquire the marine information and the navigation information from the sensor module 220 when the information can be acquired from the sensor module 220 and may acquire the marine information and the navigation information from the communication module when the information cannot be acquired from the communication module 210.

In an embodiment, the acquisition unit 251 may check the current location of the ship through the communication module 210 (e.g., a global positioning system (GPS) sensor) and acquire topographic information corresponding to the current location on the basis of the marine chart information stored in the memory 240.

The marine information may include, for example, at least one of weather-related information (e.g., wind, sea tides, sea waves, seawater temperatures, seawater densities, or sea ripple information), topographic information (e.g., coastlines, contour lines, water depths, reefs, route marks, and dangerous region information), and obstacle information (e.g., third-party ships or floating matter information). The navigation information may include sailing route information and ship state information. For example, the sailing route information may be defined for each of at least one section included between an origin and a destination. The sailing route information may include section-related information on at least one of starting coordinates (GPS coordinates) of each section, a straight distance related to each section, a direction related to each section, and a turning radius related to each section. For example, the ship state information (or the sailing state information) may include information related to at least one ship sailing state among a control time point, a ship control command, a response value corresponding to the ship control command, host ship location information, and a bow direction (or a heading direction).

According to an embodiment, the map generation unit 253 may generate a grid map by displaying topography, a host ship, and obstacles corresponding to marine information and navigation information in the surrounding environment image. The grid map may be a map obtained by mapping pixel coordinates of each surrounding environment factor included in the surrounding environment image to a grid with a specified interval (e.g., an interval with a latitude of 1° and a longitude of 1.25°) corresponding to the Earth's coordinate system. For example, the map generation unit 253 may check topographic information related to at least one topographic factor among a coastline, a contour line, a water depth, a reef, a route mark, and a dangerous region in the marine information. The map generation unit 253 may check host ship information (e.g., the location and size of the host ship) and obstacle information (e.g., the locations and sizes of third-party ships) in the navigation information. The size of the host vehicle may be acquired from the ship-specific information stored in the memory 240. The map generation unit 253 may generate the grid map by displaying the topographic information, the host ship information, and the obstacle information in the surrounding environment image in a color or icon specified for each piece of information.

According to an embodiment, the sailing method determination unit 255 may extract first feature information (e.g., an image feature vector) related to the surrounding environment factor on the basis of the grid map. For example, the sailing method determination unit 255 may extract an image feature vector (first feature information) related to at least one surrounding environment factor among topographic features (e.g., coastlines, contour lines, water depths, reefs, route marks, and dangerous regions) and obstacle features (e.g., a distance between the host ship and an obstacle).

According to an embodiment, the sailing method determination unit 255 may extract second feature information related to the dynamic characteristics of the ship on the basis of the marine information and the navigation information. For example, the sailing method determination unit 255 may extract marine features including at least one of weather-related features (e.g., wind, sea tides, sea waves, seawater densities, and sea ripples), topographic features (e.g., coastlines, contour lines, water depths, reefs, route marks, and dangerous regions), and obstacle features (e.g., speeds and moving directions of obstacles) from the marine information and the navigation information. The sailing method determination unit 255 may extract the sailing features on the basis of the location, speed, direction, and sailing control method (a ship control command and a response value corresponding to the hip control command) of the ship. The sailing method determination unit 255 may extract a feature vector related to the ship-specific dynamic characteristics corresponding to the ship state (second feature information) on the basis of the marine features and the navigation features. For example, the second feature information may include a feature vector related to the ship-specific dynamic characteristics (e.g., at least one of stability performance, motion performance, a synchronization risk between the host ship and waves, and a ship speed decrease rate) corresponding to the speed and bow direction of the host ship (ship). The ship-specific dynamic characteristics may refer to dangerousness of the surrounding marine state to a ship sailing (hereinafter referred to as "surrounding marine dangerousness").

According to an embodiment, the sailing method determination unit 255 may perform deep reinforcement learning on the basis of the first feature information and the second feature information and may determine the ship sailing method (e.g., the speed and bow direction of the ship) as a result of the deep reinforcement learning. For example, the sailing method determination unit 255 may select a plurality of candidate sailing methods having a corresponding relationship with the first feature information (e.g., a location of a risk factor in a surrounding environment) and the second feature information (e.g., ship-specific dynamic characteristics corresponding to the current ship state) on the basis of a deep reinforcement learning model stored in the memory 240 and may determine a candidate sailing method having the highest cumulative compensation value among the plurality of candidate sailing methods as the ship sailing method. For example, the deep reinforcement learning model may be determined through deep reinforcement learning on a plurality of ship states, a plurality of degrees of surrounding marine dangerousness, and a plurality of ship sailing methods corresponding to each other. As another example, the sailing method determination unit 255 may determine the speed and bow direction of the ship such that risk factors (e.g., third-party ships, obstacles, reefs, and dangerous regions) can be avoided while the stability performance, the motion performance, the synchronization risk between the host ship and the waves, and the ship speed decrease rate are within respective specified ranges. For example, each of the specified ranges may be a range predetermined so that the ship can sail stably in consideration of the surrounding marine dangerousness.

According to an embodiment, the ship control unit 257 may control an autonomous ship sailing by transmitting, to various kinds of control modules (e.g., an engine, a rudder, and the like) included in the ship, a ship control command (e.g., a speed and bow direction of a ship) corresponding to the ship sailing method determined by the sailing method determination unit 255.

According to an embodiment, the compensation determination unit 259 may monitor a ship state change after the ship control is performed by the ship control unit 257 and may determine a compensation value related to the ship sailing method on the basis of the ship state change. For example, the compensation determination unit 259 may confirm the degree to which the ship state change matches the ship control (e.g., a change in ship speed and a change in ship bow direction) corresponding to a ship control command on the basis of the marine information and the navigation information which are acquired after the ship control unit 257 controls the ship according to the ship sailing method and may determine a compensation value corresponding to the confirmed matching degree. As another example, the compensation determination unit 259 may confirm at least one required cost among a collision avoidance cost, an arrival time compliance cost, a destination access cost, and a fuel consumption reduction cost on the basis of the surrounding environment image, the marine information, and the navigation information acquired when the ship is controlled according to the determined ship sailing method. The compensation determination unit 259 may determine the compensation value to be high when the at least one required cost is low (or meets a target cost) and may determine the compensation value to be low when the at least one required cost is high (or does not meet a target cost). As another example, the compensation determination unit 259 may determine a compensation value differently depending on the importance of at least one evaluation factor among arrival at a destination, compliance with an expected arrival time, a collision, a fuel consumption amount, and a required cost. For example, the compensation determination unit 259 may add the largest compensation value when the ship arrives at a destination according to the ship control command and may subtract the largest compensation value when the ship does not arrive at the destination within the arrival time corresponding to the ship control command and when a collision occurs. The compensation determination unit 259 may add a relatively great compensation value when the ship approaches a destination, when a difference between an expected arrival time and a specified arrival time decreases, when a fuel consumption amount increases, or when a total required cost decreases. The compensation determination unit 259 may subtract a relatively small compensation value when the ship moves away from a destination, when a difference between an expected arrival time and a specified arrival time increases, when a fuel consumption amount decreases, or when a total required cost increases. In this regard, for example, the compensation determination unit 259 may check the destination, the expected arrival time, the fuel consumption amount, and the required cost on the basis of sailing plan information.

According to an embodiment, the compensation determination unit 259 may change a compensation value (a cumulative compensation value) related to the ship sailing method by adding the determined compensation value to the compensation value related to the determined ship sailing method. Thus, according to the above-described embodiment, the autonomous ship navigation apparatus 100 may determine a sailing method capable of increasing the cumulative compensation value when the learning is continuous.

The processor 250 (e.g., the ship control unit 257) may output ship sailing-related information through the output device 230. For example, the processor 250 may display the ship sailing-related information through a display such that ship sailing information corresponding to a planned sailing from an origin to a destination according to the sailing route information can be distinguished from ship sailing information corresponding to an actual sailing.

According to various embodiments, the obstacle information may be acquired from a plurality of modules (e.g., a sensor or camera included in the sensor module 220 and the communication module 210). In this case, the acquisition unit 251 may manage obstacle information such that individual obstacle information received from each module can be distinguished from integrated obstacle information obtained by integrating a plurality of pieces of obstacle information received from a plurality of modules. For example, the acquisition unit 251 may assign an ID to each of the integrated obstacle information and the individual obstacle information.

According to the above-described embodiment, the autonomous ship navigation apparatus 100 may generate a grid map using static characteristics for the surrounding environment of the ship, analyze the surrounding environment of the ship on the basis of the grid map as the captain checks visually, and determine a ship sailing method on the basis of a result of the analysis.

Also, according to the above-described embodiment, the autonomous ship navigation apparatus 100 may associate marine chart information (e.g., coastlines and water depths), weather-related information (e.g., sea waves, seawater temperatures, seawater densities, wind, and sea tides), and risk factor information (e.g., third-party ships, pieces of floating matter, and dangerous regions) according to a grid of specified intervals and may comprehensively analyze the marine chart information, the weather-related information, and the surrounding environment image.

In addition, according to the above-described embodiment, the processor 250 may determine the ship sailing method in consideration of a changing surrounding environment (e.g., weather-related information and obstacle (e.g., third-party ships) information) in addition to an unchanging surrounding environment (e.g., topographic information) in various ways.

Furthermore, according to the above-described embodiment, the autonomous ship navigation apparatus 100 may stably navigate the ship even when there is a change in the surrounding sea by determining a ship sailing method in consideration of not only the ship state information (e.g., location, speed, and bow direction) but also surrounding marine dangerousness on the basis of the marine information and the navigation information. Accordingly, the autonomous ship navigation apparatus 100 may determine a navigation method by interacting with the surrounding environment in which the ship sails, just as the captain judges the situation and sails the ship on the basis of his cumulative sailing experience.

Figure 3:
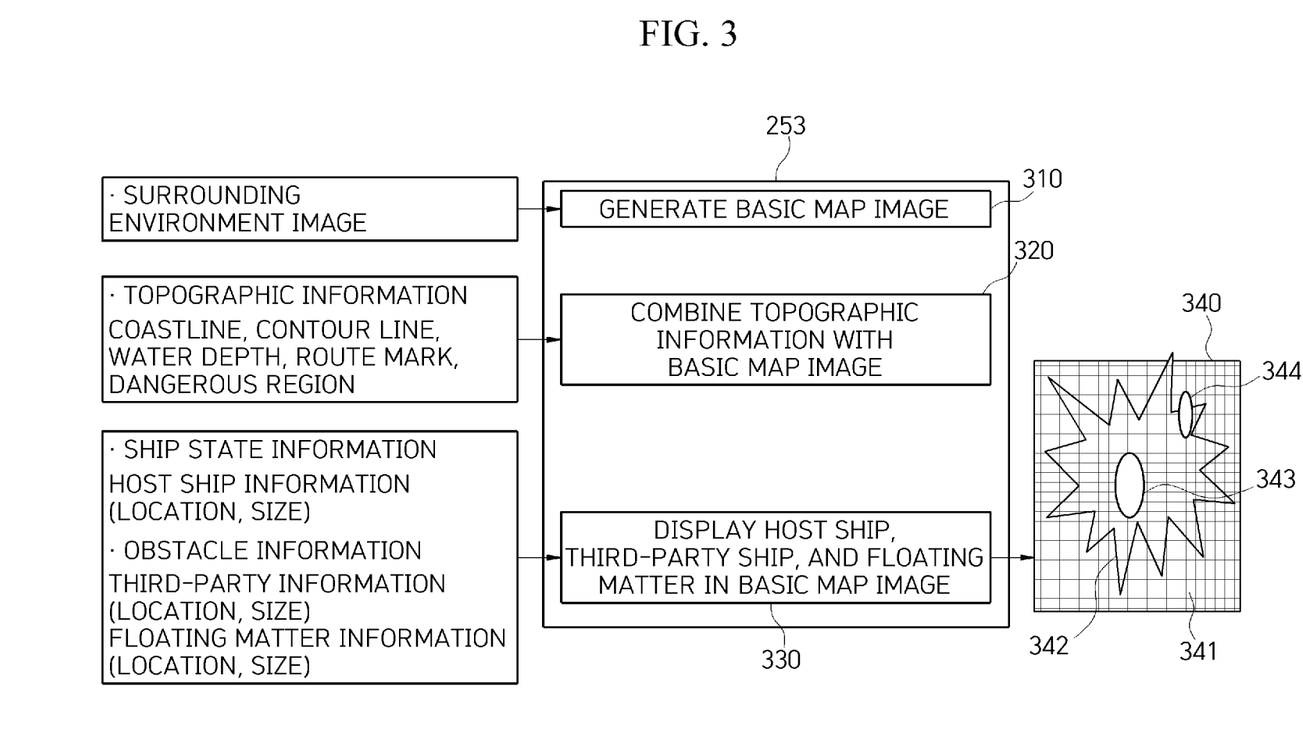
FIG. 3 shows a detailed configuration of a map generation unit according to an embodiment.

FIG. 3 shows a detailed configuration of a map generation unit according to an embodiment.

Referring to FIG. 3, in operation 310, the map generation unit 253 may generate a basic map image on the basis of at least one of a surrounding environment image captured by a camera or a marine chart information (e.g., a marine chart image). For example, the map generation unit 253 may generate the basic map image by preferentially using an image acquired from a camera and may generate the basic map image on the basis of the marine chart image when the image cannot be acquired from the camera. As another example, when a plurality of images related to a surrounding environment of a ship (e.g., surrounding environment images captured in a plurality of directions with respect to a ship) are captured, the map generation unit 253 may generate a basic map image by combining the plurality of images with respect to the ship. As still another example, the map generation unit 253 may generate the basic map image by combining (overlapping) a grid with a specified interval (e.g., an interval with a latitude of 1° and a longitude of 1.25°) corresponding to the Earth's coordinate system with pixel coordinates of each surrounding environment image.

In operation 320, the map generation unit 253 may acquire, from the acquisition unit 251, topographic information related to topographic factors (topographic information corresponding to the location of the surrounding environment (at least one of a coastline, a contour line, a water depth, a reef, a route mark, and a dangerous region)) that are difficult to check from the basic map image. The map generation unit 253 may display a color corresponding to each topographic factor at a location corresponding to the corresponding topographic factor in the basic map image. In the basic map image, for example, the map generation unit 253 may display a shallow sea part as a light color and may display a deep sea part as a dark color.

In operation 330, the map generation unit 253 may acquire host ship information (e.g., the location and size of the host ship), third-party ship information (e.g., the locations and sizes of third-party ships), and floating matter information (e.g., the location and size of pieces of floating matter) using the sensor module 220 (e.g., an MS or a radar). The map generation unit 253 may generate a grid map 340 by displaying a first icon corresponding to the host ship information (e.g., the size of the host ship) at the location of the host ship in the basic map image, displaying a second icon corresponding to the third-party ship information (e.g., the size of a third-party ship) at the location of the third-party ship in the basic map image, and displaying a third icon corresponding to obstacle information (e.g., the size of a floating matter) at the location of a floating matter in the basic map image. For example, the grid map 340 may be divided into grids and configured to display a first part 341 with a first water depth and a second part 342 with a second water depth and may include the first icon 341 indicating the location of the host ship and the second icon 342 indicating the location of the third-party ship.

According to the above-described embodiment, the autonomous ship navigation apparatus 100 may comprehensively analyze the marine chart information, the weather-related information, and the surrounding environment image by associating marine chart information (e.g., coastlines and water depths), weather-related information (e.g., sea waves, seawater temperatures, seawater densities, wind, and sea tides), and risk factor information (e.g., third-party ships, pieces of floating matter, and dangerous regions).

Figure 4:
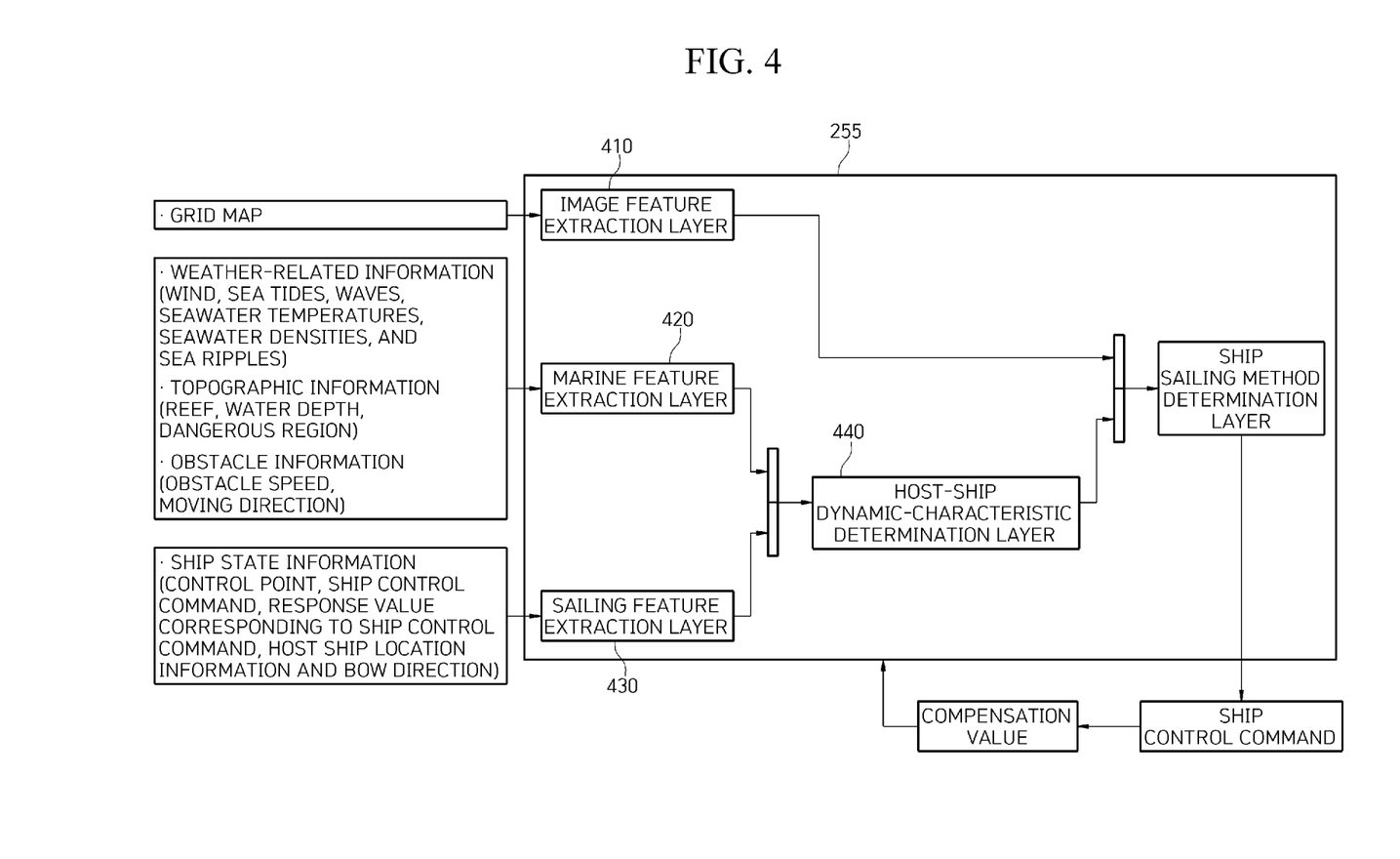
FIG. 4 shows a detailed configuration of a sailing method determination unit according to an embodiment.

FIG. 4 shows a detailed configuration of a sailing method determination unit according to an embodiment.

Referring to FIG. 4, in operation 410, the sailing method determination unit 255 may extract an image feature vector (first feature information) related to at least one surrounding environment factor among topographic features (e.g., coastlines, contour lines, water depths, reefs, route marks, and dangerous regions) and obstacle features (e.g., a distance between the host ship and an obstacle (a floating matter and a third-party ship) on the basis of a grid map.

In operation 420, the sailing method determination unit 255 may generate a marine feature vector including a weather-related feature vector, a topographic feature vector, and an obstacle feature vector on the basis of the weather-related information, the topographic information, and the obstacle information. For example, the sailing method determination unit 255 may extract the weather-related feature vector (e.g., a feature vector) by comprehensively considering numerical values related to the weather-related features (e.g., wind, sea tides, sea waves, seawater densities, and sea ripples). Also, the sailing method determination unit 255 may extract the topographic feature vector by comprehensively considering numerical values related to the topographic features (e.g., coastlines, contour lines, water depths, reefs, route marks, and dangerous regions) on the basis of the topographic information. Also, the sailing method determination unit 255 may extract the obstacle feature vector by comprehensively considering the obstacle features (e.g., the speed and moving direction of an obstacle) on the basis of the obstacle information.

In operation 430, the sailing method determination unit 255 may confirm sailing features including the location, speed, direction, and sailing control method (a ship control command and a response value corresponding to the ship control command) of the ship on the basis of ship state information and extract the sailing feature vector by comprehensively considering the confirmed sailing features.

In operation 440, the sailing method determination unit 255 may extract a dynamic-characteristic feature vector related to ship-specific dynamic characteristics on the basis of the marine feature vector and the navigation feature vector. For example, the sailing method determination unit 255 may extract a dynamic-characteristic feature vector (second feature information) related to ship-specific dynamic characteristics (e.g., at least one of stability performance, motion performance, a synchronization risk between the host ship and waves, and a ship speed decrease rate) corresponding to the speed and bow direction of the ship (the host ship).

In operation 450, the sailing method determination unit 255 may determine a ship sailing method (e.g., speed and bow direction) by performing deep reinforcement learning on the basis of the image feature vector (the first feature information) related to the surrounding environment factor and the dynamic-characteristic feature information (the second feature information) related to the ship-specific dynamic characteristics. For example, the sailing method determination unit 255 may select a plurality of candidate sailing methods having a corresponding relationship with the first feature information (e.g., a location of a risk factor in a surrounding environment) and the second feature information (e.g., a ship-specific dynamic characteristics corresponding to the current ship state) on the basis of a deep reinforcement learning model stored in the memory 240 and determine a candidate sailing method having the highest cumulative compensation value among the plurality of candidate sailing methods as the ship sailing method. As another example, the sailing method determination unit 255 may determine the sailing method such that the stability performance satisfies a first specified range (e.g., less than or equal to a first specified value), the motion performance satisfies a second specified range (e.g., less than or equal to a second specified value), the synchronization risk satisfies a third specified range (e.g., less than or equal to a third specified value), and the ship speed decrease rate satisfies a fourth specified range (e.g., greater than a fourth specified value).

After operation 450, the ship control unit 257 may control an autonomous ship sailing by transmitting a ship control command corresponding to the sailing method determined by the sailing method determination unit 255 to a control module included in the ship. For example, the ship control command may be provided by the sailing method determination unit 255.

After operation 450, the compensation determination unit 259 may monitor a change in ship state according to a ship control command and may determine a compensation value related to the ship sailing method on the basis of the change in ship state. The compensation determination unit 259 may change a compensation value related to the ship sailing method by adding the determined compensation value to the compensation value related to the determined ship sailing method.

According to the above-described embodiment, the autonomous ship navigation apparatus 100 may determine the ship sailing method through various analyses of a changing surrounding environment as well as an unchanging surrounding environment by generating a host-ship-specific dynamic-characteristic vector for analyzing motion characteristics of the sailing of the host ship caused by the marine state by using the marine feature vector extracted from the marine information and the sailing feature vector extracted from the ship state information as an input and then combining the host-ship-specific dynamic-characteristic vector with the feature vector extracted from the grid map.

Figure 5:
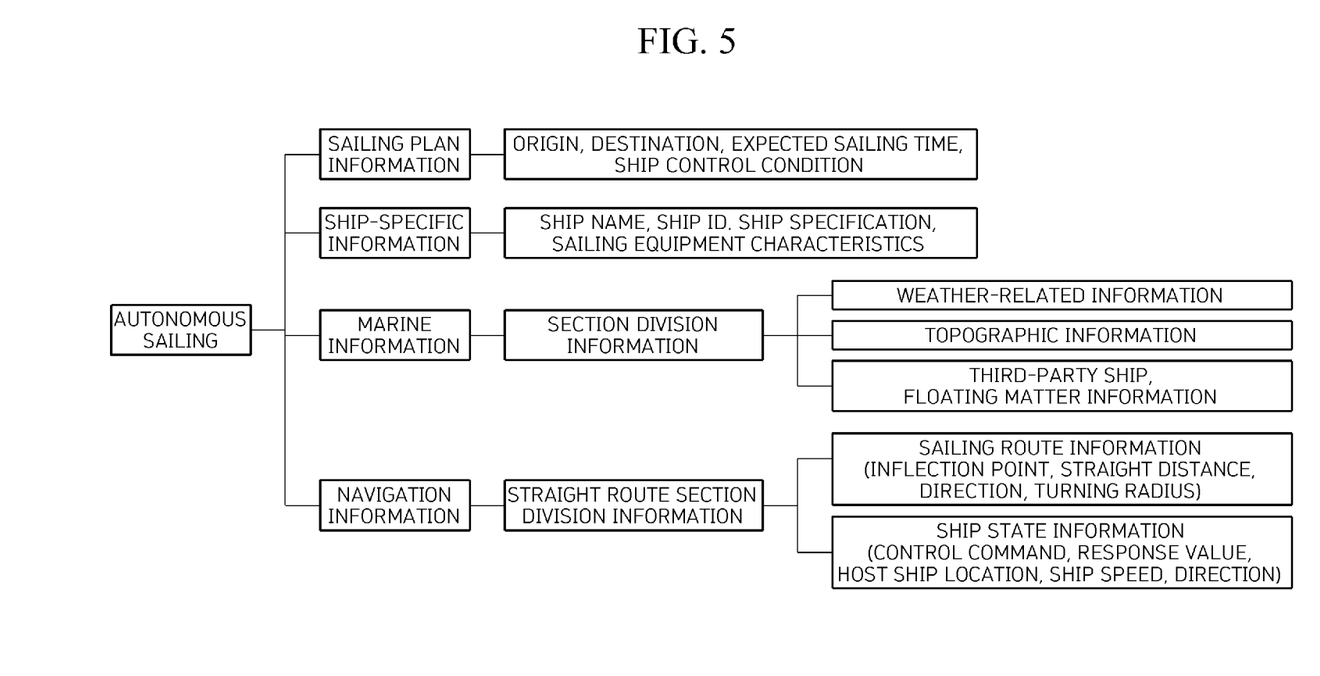
FIG. 5 shows autonomous navigation data for autonomous navigation control of an autonomous ship navigation apparatus according to an embodiment.

FIG. 5 shows autonomous navigation data for autonomous navigation control of an autonomous ship navigation apparatus according to an embodiment.

Referring to FIG. 5, the autonomous sailing data may include first type information (sailing plan information and ship-specific information) which does not change once determined and second type information (marine information and navigation information) which is frequently changed while sailing). The sailing plan information may include information related to a navigation plan (e.g., an origin, a destination, an estimated sailing time, and a ship control condition). The sailing plan information may be specified prior to the sailing of the ship. For example, the ship control condition may be a condition that should be considered in determining the ship sailing method (e.g., the above-described specified ranges). The ship-specific information includes basic information of the ship (e.g., ship name, ship number, ship specification, and navigation equipment characteristics). The second type information may be classified into the marine information that changes depending on the region and the navigation information changing depending on the sailing time.

According to an embodiment, the autonomous ship navigation apparatus 100 may classify and manage weather-related information according to the region (e.g., a region where the ship is sailing) and time. Thus, the autonomous ship navigation apparatus 100 may determine the ship navigation method using weather-related information corresponding to the current time and the current location.

According to an embodiment, the autonomous ship navigation apparatus 100 may manage ship sailing route information and ship state information according to a control point. Accordingly, the autonomous ship navigation apparatus 100 may classify a ship sailing route on the basis of a straight sailing section and manage sailing methods in an integrated manner according to point information for fine tuning, a sailing state corresponding to fine tuning, a ship sailing method, and a ship response value so as to follow the straight sailing section. In this regard, the autonomous ship navigation apparatus 100 according to an embodiment may collect and manage the ship state information and the third-party ship information at regular intervals (every 0.5 to 1 second). Accordingly, the autonomous ship navigation apparatus 100 according to an embodiment can predict a sailing route of a third-party ship that violates the International Regulations for Preventing Collisions at Sea (COLEGs) to prevent collisions.

Figure 6:
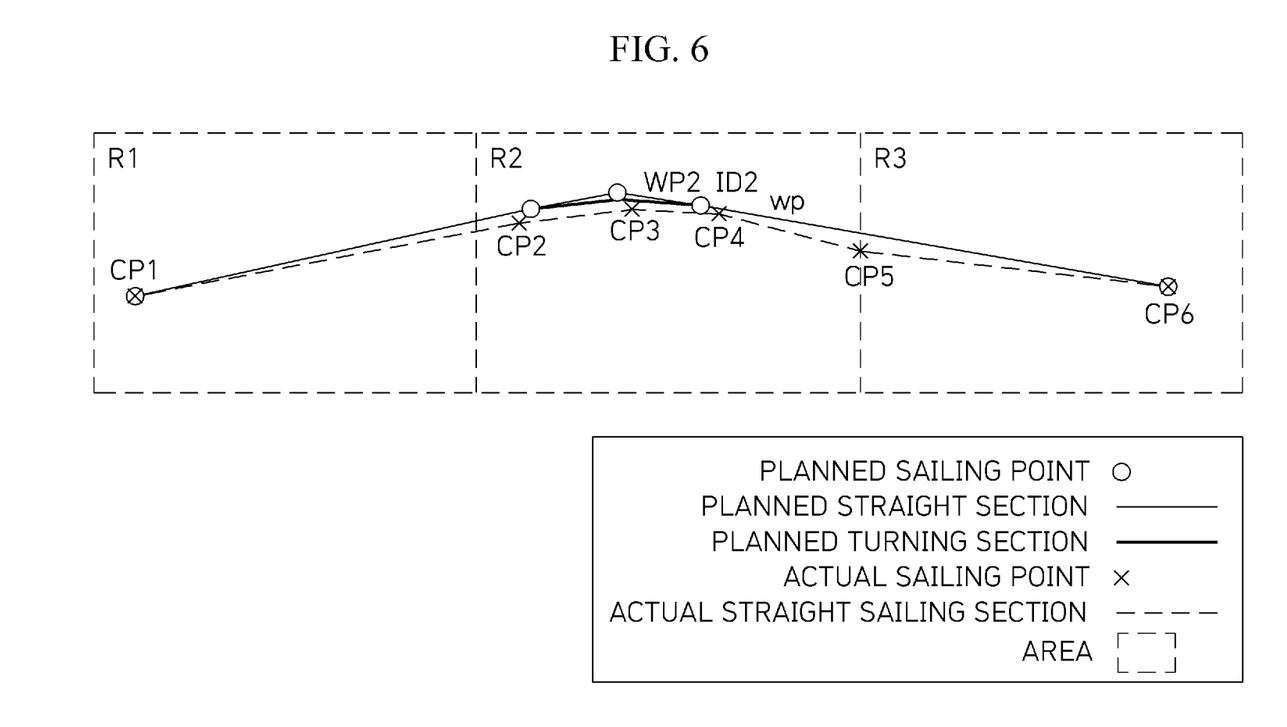
FIG. 6 shows an example of displayed ship sailing-related information according to an embodiment.

FIG. 6 shows an example of displayed ship sailing-related information according to an embodiment.

In FIG. 6, the ship sailing-related information indicates information related to a ship sailing from WP1 (origin) to WP3 (destination). WP2 may be an inflection point at which a ship rotation occurs while the ship is going to WP3. The entire route may be broadly divided into a total of three regions (i.e., R1, R2, and R3) including two straight sections R1 and R3 and one rotating section R2. The marine information, the marine chart information, and obstacle (third-party ships and pieces of floating matter) information may be defined in association with each section. Planned section information may include a total of two sections including a first section planned to connect WP1 to WP2 and a second section planned to connect WP2 to WP3.

In FIG. 6, the autonomous ship navigation apparatus starts a ship sailing on the basis of information on the total of two planned sections but may control the ship sailing at a total of five control points CP1, CP2, CP3, CP4 and CP5 while the ship is actually sailing. The autonomous ship navigation apparatus may manage (e.g., store) marine information, marine chart information, and obstacle information in relation to each region when a ship is sailing and may manage information on sailing states (direction, location, speed, and dynamics characteristics) and control commands (engine and rudder) of the ship in relation to each second (or a section divided as each control point). Accordingly, when a ship sailing ends, the autonomous ship navigation apparatus 100 may analyze a difference between an actual sailing route and a route planned upon the start of the ship sailing, a reason that caused the difference, and a cause of poor ship sailing efficiency, and thus it is possible to improve sailing efficiency through the cause analysis.

Figure 7:
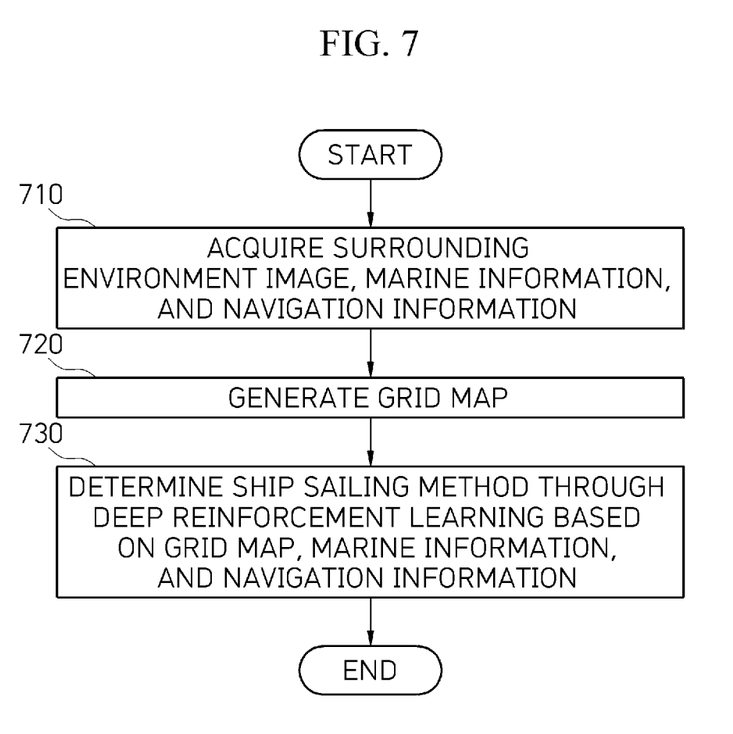
FIG. 7 shows an autonomous ship navigation method according to an embodiment.

FIG. 7 shows an autonomous ship navigation method according to an embodiment.

In operation 710, the autonomous ship navigation apparatus 100 may acquire a surrounding environment image, marine information, and navigation information. For example, the autonomous ship navigation apparatus 100 may acquire a surrounding environment image from a camera installed on a ship. The marine information may include, for example, at least one of weather-related information (e.g., wind, sea tides, sea waves, seawater temperatures, seawater densities, or sea ripple information), topographic information (e.g., coastlines, contour lines, water depths, reefs, route marks, and dangerous region information), and obstacle information (e.g., third-party ships or floating matter information). The navigation information may include sailing route information (e.g., starting coordinates for each section and a straight distance, a direction, and a turning radius of each section) and ship state information (e.g., a control point, a ship control command, a response value corresponding to the ship control command, and location information and bow direction of a host ship).

In operation 720, the autonomous ship navigation apparatus 100 may generate a grid map by displaying topography, a host ship, and obstacles corresponding to the marine information and the navigation information in the surrounding environment image. The grid map may be a map obtained by mapping pixel coordinates of each surrounding environment element included in the surrounding environment image to a grid with a specified interval (e.g., an interval with a latitude of 1° and a longitude of 1.25°) corresponding to the Earth's coordinate system.

In operation 730, the autonomous ship navigation apparatus 100 may determine a sailing method for the ship through deep reinforcement learning based on the grid map, the marine information, and the navigation information. For example, the autonomous ship navigation apparatus 100 may determine a speed and a bow direction for autonomous navigation on the basis of the first feature information and the second feature information, such that a risk factor (e.g., third-party ships, obstacles, reefs, and dangerous regions) can be avoided while the surrounding marine dangerousness is in a specified range (e.g., a range specified to stably sail the ship).

The various embodiments and the terms used herein are not intended to limit the technical features disclosed herein to specific embodiments and should be understood to include various modifications, equivalents, or alternatives of the corresponding embodiments. In describing the drawings, similar reference numerals may be used to designate similar or relevant constituent elements. The singular form of a noun corresponding to an item may include one or more items unless the context clearly indicates otherwise. Herein, phrases such as "A or B," "at least one of A and B," "at least one of A or B," "A, B, or C," "at least one of A, B, and C," "at least one of A, B, or C" may include any one or all possible combinations of items listed in the phrases. Terms such as "first" and "second" may simply be used to distinguish corresponding elements from the other elements, and the corresponding elements are not limited in other respects (e.g., importance or order). When a certain (e.g., first) element is referred to as being "coupled" or "connected" to another (e.g., second) element, with or without a term "functionally" or "communicatively", it means that the certain element can be connected to the other element directly (e.g., by wire), wirelessly, or via a third element.

The term "module" used herein may include a unit implemented in hardware, software, or firmware and may be used interchangeably with, for example, terms such as logic, logic block, component, or circuit. The "module" may be an integrated component, a minimum unit for performing one or more functions, or a part thereof. For example, according to an embodiment, the "module" may be implemented in the form of an application-specific integrated circuit (ASIC).

Various embodiments disclosed herein may be implemented by software (e.g., a program) including one or more instructions stored in a storage medium (e.g., an internal memory or an external memory; the memory 240) readable by a machine (e.g., the autonomous ship navigation apparatus 100). For example, a processor (e.g., the processor 250) of the machine (e.g., the autonomous ship navigation apparatus 100) may call and execute at least one of the one or more instructions stored in the storage medium. This allows the machine to be operated to perform at least one function in accordance with the at least one called instruction. The one or more instructions may include code generated by a compiler or code executable by an interpreter. The machine-readable storage medium may be provided in the form of a non-transitory storage medium. Here, the term "non-transitory" merely denotes that the storage medium is tangible and does not include a signal (e.g., electromagnetic waves), irrespective of whether data is semi-permanently or temporarily stored in the storage medium.

According to an embodiment, the method according to various embodiments disclosed herein may be included and provided in a computer program product. The computer program product may be traded between a seller and a purchaser as a commodity. The computer program product may be distributed in the form of a machine-readable storage medium (e.g., compact disc read-only memory (CD-ROM)) or may be distributed (e.g., downloaded or uploaded) via an application store (e.g., Play Store™), directly between two user devices (e.g., smartphones), or online. For online distribution, at least a portion of the computer program product may be at least provisionally generated or temporarily stored in a machine-readable storage medium such as a memory of a manufacturer's server, an application store's server, or a relay server.

According to various embodiments disclosed herein, it is possible to autonomously navigate a ship based on a surrounding environment state and a ship sailing state. In addition, it is possible to provide various advantageous effects that are directly or indirectly obtained through this document.

According to various embodiments, each of the above-described elements (e.g., modules or programs) may include one or more entities. According to various embodiments, one or more of the above-described elements or operations may be omitted, or one or more other elements or operations may be added. Alternatively or additionally, a plurality of elements (e.g., modules or programs) may be integrated into one element. In such a case, the integrated element may perform one or more functions of each of the plurality of elements in the same or a similar manner as being performed by the corresponding one among the plurality of elements prior to the integration. According to various embodiments, operations performed by a module, a program, or other elements may be executed sequentially, in parallel, repeatedly, or heuristically. One or more of the operations may be omitted or executed in different orders. Alternatively, one or more other operations may be added.

What is claimed is:

1. An autonomous ship navigation apparatus comprising:
   a processor;
   an acquisition unit configured to acquire, via the processor, a surrounding environment image, marine information, and navigation information;
   a map generation unit configured to generate, via the processor, a grid map by displaying topography, a host ship, and an obstacle corresponding to the marine information and the navigation information in the surrounding environment image; and
   a sailing method determination unit configured to determine, via the processor, a sailing method of a ship through deep reinforcement learning based on the grid map, the marine information, and the navigation information,
   wherein the sailing method determination unit;
   extracts, via the processor, a first feature information related to a surrounding environment of the ship on the basis of the grid map;
   extracts, via the processor, a second feature information related to dynamic characteristics of the ship on the basis of the marine information and the navigation information; and
   determines, via the processor, the sailing method through deep reinforcement learning on the basis of the first feature information and the second feature information,
   wherein the second feature information includes stability performance, and
   the sailing method determination unit determines via the processor, the sailing method such that the stability performance satisfies a first specified range.

2. The autonomous ship navigation apparatus of claim 1, wherein the marine information includes at least one of weather-related information, topographic information, and obstacle information.

3. The autonomous ship navigation apparatus of claim 1, wherein the navigation information includes at least one of sailing route information and ship state information.

4. The autonomous ship navigation apparatus of claim 1, wherein the acquisition unit acquires the surrounding environment image from a camera installed on the ship.

5. The autonomous ship navigation apparatus of claim 4, wherein the map generation unit generates, via the processor, the grid map on the basis of a marine chart image when the surrounding environment image cannot be acquired from the camera.

6. The autonomous ship navigation apparatus of claim 1, wherein the map generation unit is configured, via the processor, to:
   check topographic information related to at least one topographic factor among a coastline, a water depth, a contour line, a reef, a route mark, and a dangerous region in the marine information;
   check host ship information and obstacle information in the navigation information;
   generate a basic map image by mapping each pixel of the surrounding environment image to a grid with a specified interval corresponding to the Earth's coordinate system, and
   generate the grid map by displaying the topographic information, the host ship information, and the obstacle information in the basic map image.

7. The autonomous ship navigation apparatus of claim 6, wherein the map generation unit displays a location, via the processor, corresponding to the topographic factor with a color corresponding to the topographic factor in the basic map image.

8. The autonomous ship navigation apparatus of claim 6, wherein the map generation unit is configured, via the processor, to:
   display a first icon corresponding to the host ship information at a location of the host ship corresponding to the host ship information in the basic map image; and display a second icon corresponding to the obstacle information at a location of the obstacle corresponding to the obstacle information in the basic map image.

9. The autonomous ship navigation apparatus of claim 1, wherein
the first feature information is related to at least one marine feature among a weather-related feature, a topographic feature, and an obstacle feature corresponding to the grid map,
the first feature information includes dangerousness of at least a portion of the weather-related feature, the topographic feature, and the obstacle feature checked based on the marine information and the navigation information to a ship sailing, and
the sailing method configured to control a location of the host ship such that a risk factor including a dangerous region corresponding to the topographic feature and an obstacle corresponding to the obstacle feature are avoided and such that the dangerousness is determined to be within a specified range.

10. The autonomous ship navigation apparatus of claim 1, wherein
the second feature information includes motion performance, and
the sailing method determination unit determines the sailing method such that the motion performance satisfies a second specified range.

11. The autonomous ship navigation apparatus of claim 1, wherein
the second feature information includes a synchronization risk between the ship and waves, and
the sailing method determination unit determines the sailing method such that the synchronization risk satisfies a third specified range.

12. The autonomous ship navigation apparatus of claim 1, wherein
the second feature information includes a ship speed decrease rate, and
the sailing method determination unit determines the sailing method such that the ship speed decrease rate satisfies a fourth specified range.

13. The autonomous ship navigation apparatus of claim 1, further comprising a compensation determination unit, and
the compensation determination unit is configured, via the processor, to:
check at least one required cost among a collision avoidance cost, an arrival time compliance cost, a destination access cost, and a fuel consumption reduction cost on the basis of the surrounding environment image, the marine information, and the navigation information acquired when the sailing method is performed; and
determines a compensation value related to the sailing method on the basis of the at least one required cost, and
the sailing method determination unit determines a subsequent sailing method on the basis of the compensation value.

14. The autonomous ship navigation apparatus of claim 1, further comprising a compensation determination unit, and
the compensation determination unit is configured, via the processor, to:
check at least one evaluation factor among arrival at a destination, compliance with an expected arrival time, a collision, a fuel consumption amount, and a required cost; and
determine a compensation value specified according to importance of the at least one evaluation factor.

15. An autonomous ship navigation method performed by an autonomous ship navigation apparatus, the autonomous ship navigation method comprising:
acquiring a surrounding environment image, marine information, and navigation information;
generating a grid map by displaying topography, a host ship, and an obstacle corresponding to the marine information and the navigation information in the surrounding environment image; and
determining a sailing method of a ship through deep reinforcement learning based on the grid map, the marine information, and the navigation information,
wherein the sailing method determining includes:
extracting a first feature information related to a surrounding environment of the ship on the basis of the grid map;
extracting a second feature information related to dynamic characteristics of the ship on the basis of the marine information and the navigation information; and
determining the sailing method through deep reinforcement learning on the basis of the first feature information and the second feature information,
wherein the second feature information includes stability performance, and
the sailing method determination unit determines the sailing method such that the stability performance satisfies a first specified range.

16. The autonomous ship navigation method of claim 15, wherein the generating comprises:
checking topographic information related to at least one topographic factor among a coastline, a water depth, a contour line, a reef, a route mark, and a dangerous region in the marine information;
checking host ship information and obstacle information in the navigation information;
generating a basic map image by mapping each pixel of the surrounding environment image to a grid with a specified interval corresponding to the Earth's coordinate system; and
generating the grid map by displaying the topographic information, the host ship information, and the obstacle information in the basic map image.

17. The autonomous ship navigation method of claim 15, wherein the determining comprises:
extracting first feature information related to a surrounding environment of the ship on the basis of the grid map;
extracting second feature information related to dynamic characteristics of the ship on the basis of the marine information and the navigation information; and
determining the sailing method through deep reinforcement learning on the basis of the first feature information and the second feature information.

18. A computer-readable recording medium storing processor-executable instructions, the instructions causing a processor of an autonomous ship navigation apparatus to:
acquire a surrounding environment image, marine information, and navigation information;
generate a grid map by displaying topography, a host ship, and an obstacle corresponding to the marine information and the navigation information in the surrounding environment image; and
determine a sailing method of a ship through deep reinforcement learning based on the grid map, the marine information, and the navigation information,
wherein the sailing method determination includes:

extract, via the processor, a first feature information related to a surrounding environment of the ship on the basis of the grid map;
extract, via the processor, a second feature information related to dynamic characteristics of the ship on the basis of the marine information and the navigation information; and
determine, via the processor, the sailing method through deep reinforcement learning on the basis of the first feature information and the second feature information,
wherein the second feature information includes stability performance, and
the sailing method deamination determines, via the processor, the sailing method such that the stability performance satisfies a first specified range.

* * * * *